United States Patent [19]

Voelz

[11] Patent Number: 4,457,389
[45] Date of Patent: Jul. 3, 1984

[54] STEERING SYSTEM FOR GANTRY-TYPE CRANE

[75] Inventor: Richard Voelz, Butler, Wis.

[73] Assignee: Renner Manufacturing Company, Milwaukee, Wis.

[21] Appl. No.: 322,475

[22] Filed: Nov. 18, 1981

[51] Int. Cl.³ .............................................. B62D 5/08
[52] U.S. Cl. ................................................... 180/140
[58] Field of Search ......................................... 180/140

[56] References Cited

U.S. PATENT DOCUMENTS

| | | | |
|---|---|---|---|
| 2,512,979 | 6/1950 | Strotmer | 180/140 |
| 2,863,518 | 12/1958 | Pellizzetti | 180/140 |
| 3,087,564 | 4/1963 | Quayle | 180/140 |
| 3,495,846 | 2/1970 | Tax | 180/140 |
| 3,696,881 | 10/1972 | Gordon | 180/140 |
| 4,284,159 | 8/1981 | Voelz | 180/140 |

FOREIGN PATENT DOCUMENTS 1010373  5/1977  Canada ............................... 180/140

*Primary Examiner*—Joseph F. Peters, Jr.
*Assistant Examiner*—Kenneth R. Rice
*Attorney, Agent, or Firm*—Fred Wiviott

[57] ABSTRACT

A steering system for a gantry-type crane includes a hydraulic cylinder coupled to each wheel and operable to turn the same through at least a right angle. A hydraulic control system includes a first control valve having a two-wheel steering mode for connecting a first pair of cylinders to a pressure source and in a series relation with each other for two-wheel steering and having a four-wheel mold for connecting the first pair of cylinders in a parallel relation with each other for four wheel steering. A second control valve means has a two-wheel mode for isolating a second pair of cylinders from the pressure source and a four-wheel steering mold for connecting the second pair of cylinders to a pressure source. The first and second control valve means are selectively operable for sequentially moving each of the pairs of cylinders between their first and second steering modes.

7 Claims, 4 Drawing Figures

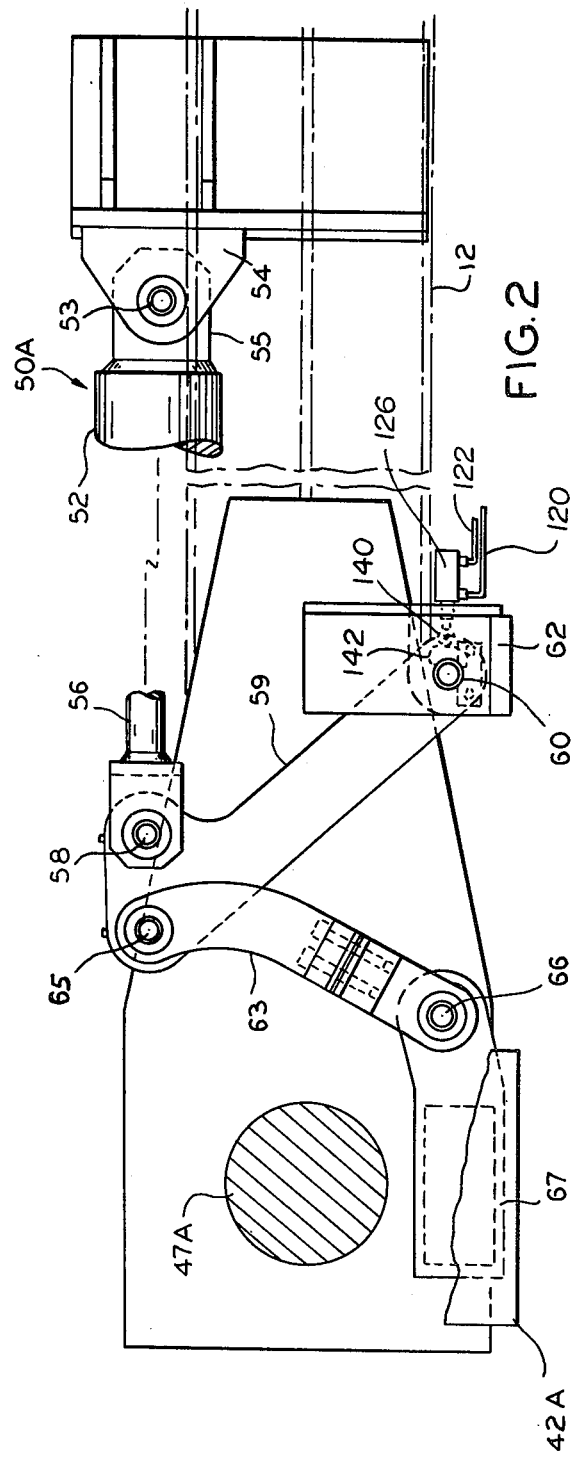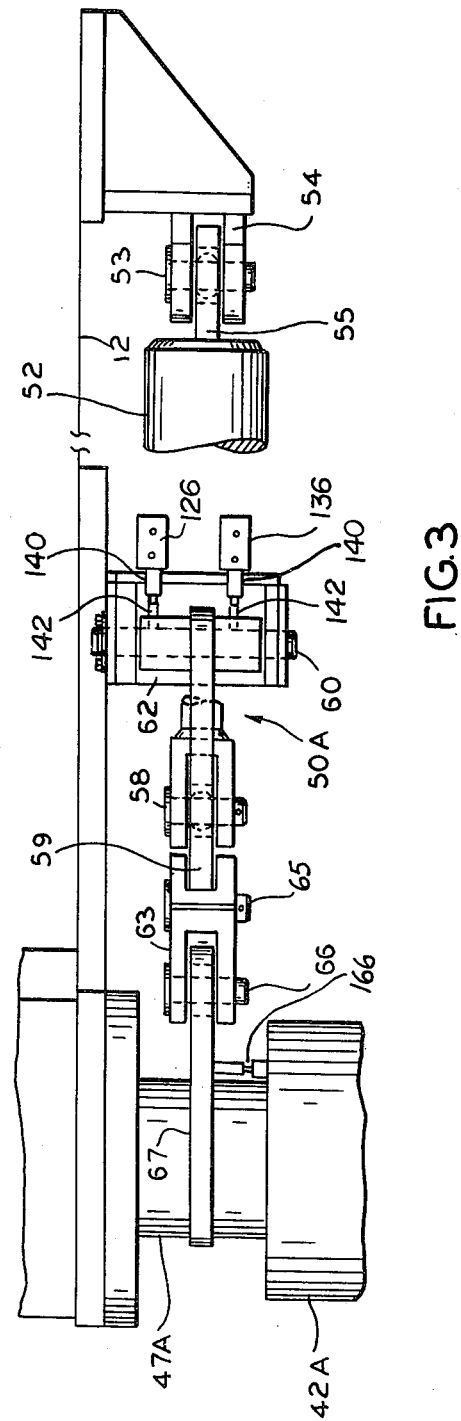

STEERING SYSTEM FOR GANTRY-TYPE CRANE

BACKGROUND OF THE INVENTION

This invention relates to mobile type cranes and more particularly to a steering system for mobile cranes which permits both two and four wheel steering modes.

Stradle type gantry cranes are commonly employed for lifting and moving large bulky objects, such as shipping containers, structural members, modular building sections, heavy machinery and equipment and the like. Such devices are well-known and generally include a pair of inverted U-shaped gantries each comprising cross beams spanning vertical columns supported at their lower ends on wheels or truck assemblies. The two gantries are interconnected by spaced side members and may include hoists supported from cross beams by means of a trolly. This permits the load to be elevated and traversed laterally.

Mobile type cranes must be sufficiently maneuverable for being positioned above the load prior to elevation and for transmitting the load from one location to another. When operating in a shop or storage area, for example, the crane will normally be required to move longitudinally up and down an aisle and in addition, laterally between aisles. This requires a relatively flexible steering assembly. While four wheel gantry steering systems are known in the prior art, such as that disclosed in U.S. Pat. No. 4,284,159, there is a need for a steering system which performs the steering function but is relatively simpler and less costly.

SUMMARY OF THE INVENTION

It is an object of the invention to provide a new and improved steering system for gantry-type cranes.

A further object of the invention is to provide a new and improved system for steering gantry-type cranes in both two wheel and four-wheel steering modes.

A further object of the invention is to provide a two and four-wheel steering system for gantry-type cranes which is simple and economical.

These and other objects and advantages of the present invention will become more apparent from the detailed description thereof taken with the accompanying drawings.

In general terms the invention comprises a steering system for a gantry-type crane having a pair of front wheel means and a pair of rear wheel means. First and second hydraulic wheel turning means are coupled respectively to the front wheel means and third and fourth hydraulic wheel turning means coupled respectively to the rear wheel means. The hydraulic wheel turning means is operable when pressurized to turn its respective wheel means through at least a right angle. Hydraulic control means are coupled to the first and second hydraulic wheel turning means and have a two-wheel steering mode for connecting the first and second hydraulic means to a source of hydraulic pressure for two-wheel steering and having a four-wheel mode for connecting each of the first and second hydraulic means to the source of hydraulic pressure for turning the front and rear wheel means through 90 degree angles. Actuating means is operative to selectively place the control means in its two or four-wheel steering modes. Steering means is disposed between the hydraulic control means and the source of hydraulic pressure for regulating the flow of hydraulic fluid to the first and second hydraulic means to control the turning angle of said front wheel means during two wheel steering.

BRIEF DESCRIPTION OF THE DRAWINGS

FIG. 2 is a top plan view of one portion of the steering assembly supplied to a front wheel truck of the gantry crane of FIG. 1;

FIG. 3 is a front view of the steering mechanism shown in FIG. 2; and

DETAILED DESCRIPTION OF THE PREFERRED EMBODIMENT

Figure 1:
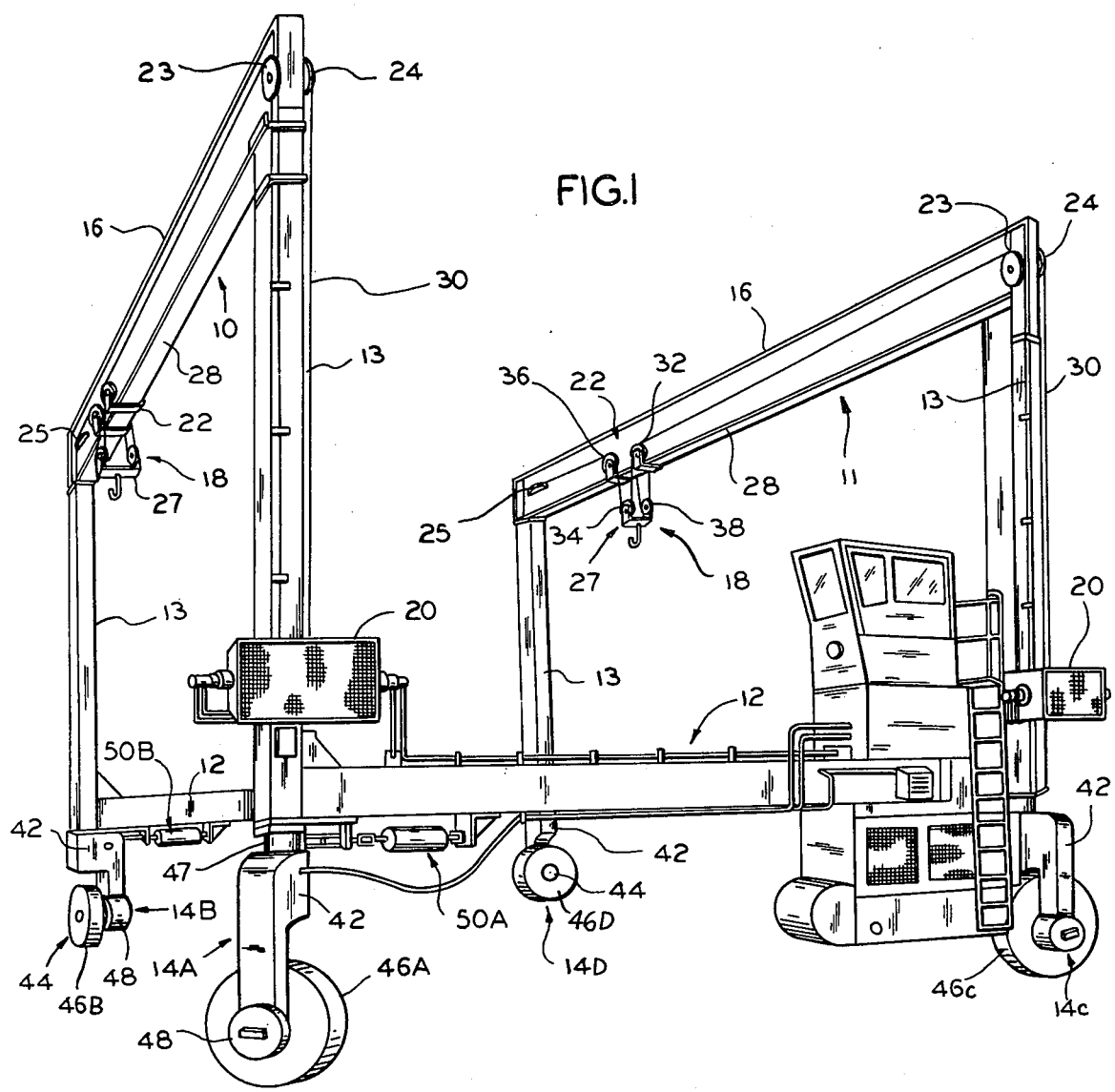
FIG. 1 is a perspective view of a gantry-type crane which includes a steering system according to the present invention.

Referring to FIG. 1, the gantry-type mobile crane to which the present invention is applicable is shown to include a pair of U-shaped gantries 10 and 11 connected by spaced side girders 12. Each gantry includes a pair of vertical column members 13 supported at their lower ends by truck assemblies 14 and interconnected at their upper ends by horizontal cross members 16. For purposes of discussion, the reference numeral 14 will be used when discussing the trucks 14 collectively while the numerals and letters 14A, 14B, 14C and 14D will be used specifically to identify the trucks located at the right front, left front, right rear and left rear, respectively, of the assembly. Other portions of the assembly discussed below will be similarly identified depending upon whether the portions are discussed generally or specifically.

Each gantry 10 and 11 also includes a lifting assembly 18 which are identical and accordingly, only one will be described for the sake of brevity. Each lifting assembly 18 includes a winch 20, a trolley 22, idler sheaves 23, 24 and 25 and a hook block 27. As those skilled in the art will appreciate, the trolley 22 includes wheels (not shown) which ride on flanges 28 on each of the opposite sides of its associate cross beams 16. A wire rope extends upwardly from each winch 20, over sheaves 23, around a first sheave 32 on trolley 22, downwardly and around a pulley 34 on hook block 27, upwardly and over a second sheave 36 on trolley 22, around sheave 25 at the opposite side of beam 16, backwardly along the opposite side of beam 16, around an additional sheave (not shown) on trolley 22, around a second pulley 38 on hook block 27, upwardly and over another sheave (not shown) on the opposite side of beam 16, around sheave 24 and back to winch 20. Because the operation of trolley 22 and hook block 27 form no part of the invention, they will not be discussed in detail. It will be sufficient for purposes of understanding the invention merely to state that the trolleys 22 may be moved longitudinally on their respective cross beams 16 and the hook blocks 27 may be elevated for purposes of positioning, lifting and replacing a load.

Each truck 14 includes a yoke 42 upon which an axle 44 rotatably supports a wheel 46. The yokes 42 are pivotally mounted for movement about vertical axes by means of a vertically extending king pin 47 suitably received in a bearing (not shown) in the lower end of its associated column 13. Also mounted on each front yoke 42 is a hydraulic drive motor 48 for rotating wheels 46 whereby the assembly may be moved from one location to another. Each wheel assembly 14 is provided with a steering assembly 50A (only those in the front are visible in FIG. 1) which are identical except that those on one side are a mirror image of those on the other and those at the rear are the reverse of those in the front. Accordingly, only steering assembly 50A will be discussed in connection with FIGS. 2 and 3. In particular, steering assembly 50A includes a cylinder 52 pivotally mounted at one end by means of a pin 53 extending vertically through a bracket 54 affixed to the side of girder 12 and a lug 55 affixed to the end of cylinder 52. A piston rod 56 extends from the other end of cylinder 52 and is pivotally connected at its end by means of a pin 58 to one end of a bell crank arm 59, the other end of which is pivotally mounted by means of a pin 60 to a bracket 62 affixed to girder 12 in spaced relation from bracket 54. A clevis arm 63 is pivotally connected by a pin 65 to the end of crank arm 59 adjacent pin 58. The other end of clevis arm 63 is pivotally connected by pin 66 to a steering arm 67 affixed to one side of yoke 42A.

The steering assembly 50A is shown in its neutral position in FIGS. 2 and 3 wherein the wheels 46 are pointed forwardly and the piston rod 56 is in a midpoint position relative to cylinder 52. When it is desired to turn the wheel 46 in a counterclockwise direction as viewed in FIG. 2, the piston rod 56 is forced inwardly of cylinder 52 thereby rocking bell crank arm 59 clockwise which in turn pivots yoke 42A counterclockwise through the agency of clevis arm 63. Movement of the wheel in a clockwise direction is accomplished by moving piston rod 56 outwardly of cylinder 52 thereby rocking bell crank arm 59 counterclockwise thereby rotating yoke 42 clockwise about king pin 47A.

Figure 4:
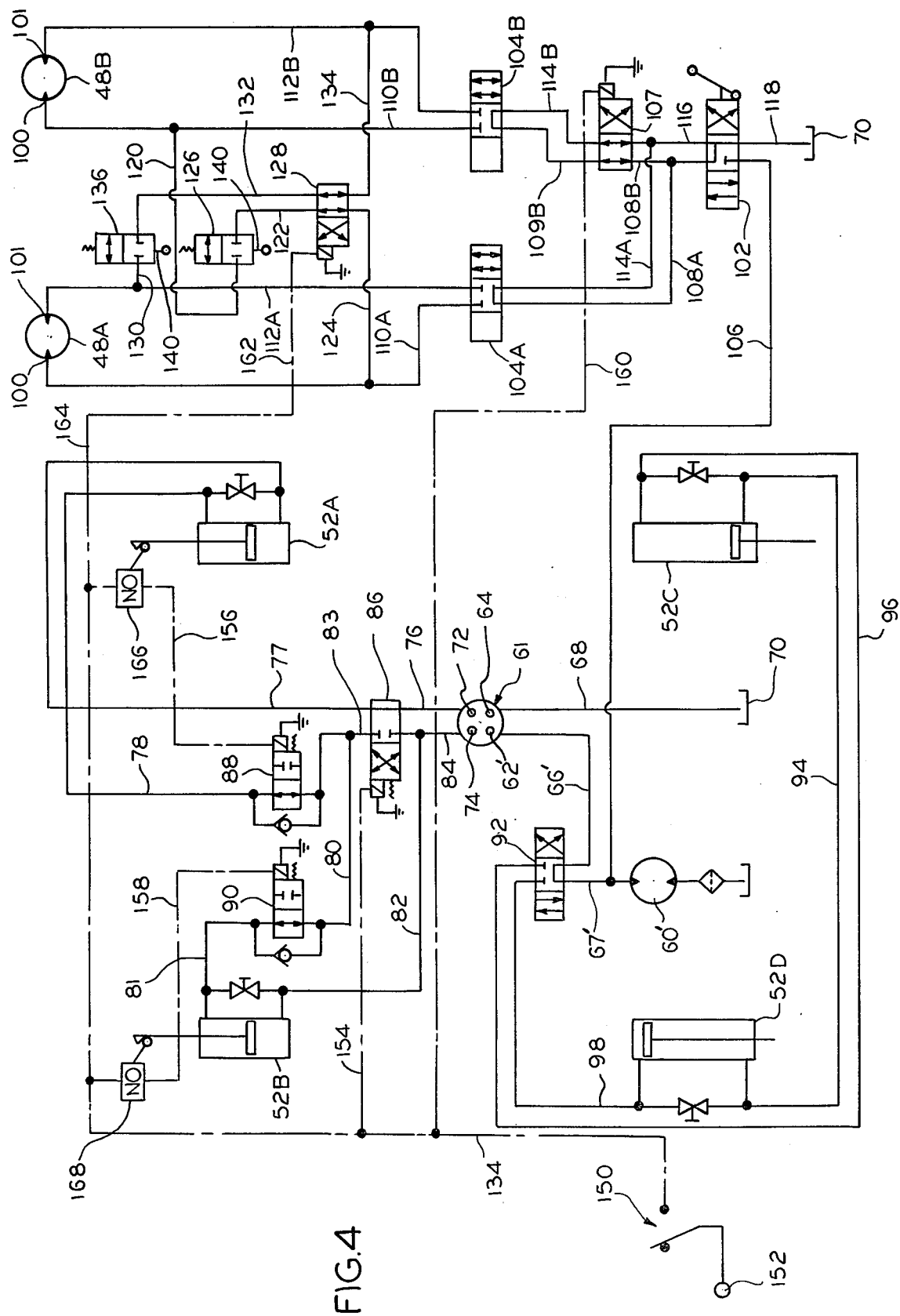
FIG. 4 schematically illustrates the hydraulic circuit of the drive wheels of the gantry-type crane shown in FIG. 1.

FIG. 4 schematically illustrates the hydraulic and electrical circuits for selectively coupling the various steering cylinder 52A, 52B, 52C and 52D to a steeering pump 60'. Specifically, there is an orbital steering valve 61 having a first pair of ports 62' and 64 which are coupled respectively by conduits 66' and 67' to pump 60' and by conduit 68 to a sump 70. The front steering cylinders 52A and 52B are connected in series between a second pair of ports 72 and 74 of orbital steering valve 61 by conduits 76, 77, 78, 79, 80, 81, 82, 83 and 84. A first solenoid operated reversing valve 86 is connected between conduits 76, 77 and 83, 84 while solenoid operated blocking valves 88 and 90 are respectively connected between conduits 78, 79 and 80, 81. The rear steering cylinders 52C and 52D are connected in series with each other and to a steering valve 92 by conduits 94, 96 and 98. Valve 92 is operable when actuated to connect conduits 96 and 98 to conduits 66' and 67' respectively.

It will be appreciated that motors 48A and 48B are each conventional, reversible rotary hydraulic motors having an inlet 100 and an outlet 101 which defines the forward direction. The pump 60 is coupled to the inlet 100 of motor 48A by a manually operable pilot propulsion valve 102, propulsion valve 104A and conduits 106, 108A and 110A. A return path from the outlet 101 of motor 48A to sump 70 is provided by valves 102, 104A and conduits 112A, 114A, 116 and 118. Similarly, a flow path to motor 48B from pump 60' to sump 70 is provided by pilot propulsion valve 102, propulsion valve 104B and conduits 106, 108B, 109B, 110B, 112B, 114B, 116 and 118. The valves 104A and 104B may be solenoid operated and are shown in their neutral positions wherein no fluid is delivered to either of the motors 48A or 48B. If it is desired to drive the wheels 46A and 46B their forward direction, each of the valves 104A and 104B will be actuated and valve 102 will be stepped to the right as viewed in FIG. 4. On the other hand, should it be desired to drive the motors 48A and 48B in the reverse direction, valves 104A and 104B will be actuated and valve 102 is stepped to the left.

Conduits 120, 122 and 124 and valves 126 and 128 interconnect conduits 110A and 110B and conduits 130, 132 and 134 and valves 136 and 128 interconnect conduits 112A and 112B. Valves 126 and 136 are each of the type having an orifice or flow passage whose size is governed by the position of a spool which is biased by a spring to a closed position. The spool is movable progressively to an open position when a plunger 140 is depressed. As seen more particularly in FIGS. 2 and 3, plunger 140 is engaged by a cam 142 mounted on one of the bell crank arms 59, although it may also be mounted on any part of the steering systems 50 or yokes 42. The valves 126 and 136 may each be mounted adjacent the same bell crank arm 59 as shown in FIG. 3 for being simultaneously opened or each valve may be mounted adjacent a different bell crank arm. Valves 107 and 128 are reversing valves for driving motor 48A in the direction opposite to motor 48B for reasons which will be discussed more fully herein below.

Each of the valves 86, 88, 90, 107 and 128 are spring biased to their positions shown in FIG. 4 and may be stepped to their alternate positions by a switch 150 which is manually operable to connect each valve solenoid to a source of power 152. More particularly, conductors 154, 156, 158, 160 and 162 respectively connect valves 86, 88, 90, 107 and 128 to a bus 164 which in turn is connected to switch 150. In addition, limit switches 166 and 168 are respectively connected into conductors 156 and 158 and each is normally open and is closed when its respective cylinder 52A or 52B is in a central position which occurs when the wheels 46A and 46B is oriented in a forwardly direction.

It will be understood that the front and rear wheels will be pointed forwardly upon the commencement of either two or four wheel steering. When it is desired to operate the system in its two-wheel steering mode, the switch 150 is placed in its open position as shown in FIG. 4. As a result, each of the valves 86, 88, 90, 107 and 128 will be in their modes shown in FIG. 4. In addition, steering valve 92 is in its neutral position so that conduits 66' is connected directly with conduit 67' whereby hydraulic fluid is delivered from pump 60' to the orbital steering valve 61. When steering valve 61 is turned in a first direction such that port 64 is connected to port 72 and port 62' is connected to port 74, hydraulic flow will be through conduits 82 and 84 to the lower end of cylinder 52B and from the upper end thereof through conduit 81, valve 90, conduit 80, valve 88 and conduit 78 to the upper end of cylinder 52A. The lower end of cylinder 52A is connected by conduit 77, valve 86, conduit 76, orbital steering valve 61 and conduit 68 to sump 70. This will cause both the front wheels 46 to turn in the same direction but with the wheel at the inside of the turn pivoting through a greater angle. For turning in the opposite direction, the orbital steering valve is turned such that port 62' is connected to port 72 and port 64 is connected to port 74. This will result in fluid flowing from pump 60' to the lower end of cylinder 52A and from the upper end thereof to cylinder 52B and then to the sump 70 from the lower end of the latter cylinder. When in the two wheel steering mode, the motors 48A and 48B can both be driven in a forward direction by stepping valves 104A and 104B to the left and moving valve 102 to the right. The motors can also be driven in the reverse direction by moving valve 102 to the left.

When four-wheel steering is desired, and with the front wheels 46A and 46B oriented in a forwardly direction, switch 150 is closed thereby stepping valve 86 to the right to connect conduits 84 to 77 and 76 to 82. The solenoids of valves 88 and 90 remain deenergized however because of normally open limit switches 166 and 168. The orbital steering valve 61 is rotated counterclockwise as viewed in FIG. 4 so that port 64 is connected to port 74 and port 62' is connected to port 72. It can thus be seen that the front steering cylinders 52A and 52B are connected in a parallel relation so that each will rotate outwardly. When each of the cylinders 52A and 52B reaches a 90 degree rotated position, the cylinders will bottom out and rotation of the forks will terminate. The closing of switch 150 also moves valve 107 to the left so that motor 48A will rotate in an opposite direction relative to motor 48B. However, because each of the front wheels 46 are now in effect facing in opposite directions, they will actually roll in the same direction.

After the front wheels have been turned 90 degrees, the rear wheels can likewise be rotated through the same angle by manually moving valve 92 to the right to place them in series circuit relation with each other and with the pump 60'. When the rear wheels 46 have also been rotated through 90 degrees, each of the cylinders 52C and 52D will bottom. At this point, the valve 92 is returned to its neutral position whereby each of the rear wheels are also locked. The crane 10 may then be propelled in either lateral direction by manual operation of the valve 102.

When it is desired to return the system to two-wheel steering, the valve 92 is first manually operated to the left whereby each of the cylinders 52C, and 52D are again placed in the series with the pump 60' but with fluid flow in the opposite direction. Each of the rear wheels will then pivot until it is oriented in a forward direction at which time the cylinders will again bottom at which point valve 92 is released so that the wheels are then locked in a forward direction. The orbital steering valve 61 is then rotated in a clockwise direction to connect port 62' to port 74 and port 64 to port 72. This will connect the pump 60' to the lower end of each of the cylinders and each of the upper ends to the sump 70. As seen in FIG. 4, there is a normally open limit switch 166 and 168 in circuit respectively with the solenoids of valves 88 and 90. FIG. 3 illustrates that each switch (only switch 166 is shown) is mounted respectively between the fork 42 and the steering assembly 50 of each front wheel. When each of the cylinders 52A and 52B reach their mid positions wherein each of the wheels 46 are oriented in a straight-ahead direction, the respective, normally open limit switches 166 and 168 will close thereby energizing the solenoids of valves 88 and 90. As each solenoid is energized, the valves will step to the left, thereby open circuiting each of the hydraulic circuits so that the wheels are then locked in a forward direction. The switch 150 is then opened whereby each of the valves 86, 88, 90, 107 and 128 revert to their two-wheel positions.

When the wheels 48A and 48B are directed forwardly, that is during two-wheel steering, the plungers 140 and valves 126 and 136 will be in a center position with respect to the cam 141 and accordingly each of the valves will be closed. When in this position, pressurized fluid from pump 60' will flow to each of the wheels without cross-over. As a result, should one of the wheels move onto a patch of ice, for example, the other wheel can still be driven. Also, should one of the wheels engage an obstacle, both wheels will be driven at the same speed so that the frame will not yaw.

Where it is desired to turn the crane in either direction, the crank arm 59 on each side of the assembly will be pivoted simultaneously. However, because of the distance between the wheels 46A and 46B, it is necessary that the wheel on the same side as the direction on which the crane is being turned, be pivoted to a greater angle than the other wheel. This is shown in FIG. 1 where wheel 46B has been turned to a greater angle than wheel 46A. It would also be appreciated that the wheel of the outside of the turn will have to move through a longer arc than the other wheel and therefore, must rotate at a faster rate. The actuation of the steering assembly 58 will also rotate the king pin 48 thereby causing cams 141 to depress plungers 140 to open the valve 126 and 136. The angle that the crank 59 will move to fully open the valves will depend upon the distance between each of the various wheels. In any event, as the valves begin turning, fluid from the motor which is rotating at the slower speed can by-pass and flow to the other motor thereby permitting differential rotation. The cross-over flow will continue to the more rapidly rotating motor until the wheels are again returned to alignment.

While only a single embodiment of the invention has been illustrated and described, it is not intended to be limited thereby but only by the scope of the appended Claims.

I claim:

1. A steering system for gantry-type crane having a pair of front wheel means and a pair of rear wheel means,
 a source of hydraulic pressure,
 first and second hydraulic wheel turning cylinders coupled respectively to said front wheel means and third and fourth hydraulic wheel turning cylinders coupled respectively to said rear wheel means, said hydraulic wheel turning cylinders being operable when pressurized to turn its respective wheel means through at least a right angle,
 Hydraulic control means including a first control valve means coupled to said first and second hydraulic wheel turning cylinders and to said source of hydraulic pressure and having a two-wheel steering mode for connecting said first and second hydraulic wheel turning cylinders to said source of hydraulic pressure and in a first hydraulic circuit relation with each other for two-wheel steering so that said cylinders turn their respective wheels through different turning angles, said hydraulic control means also having a four-wheel mode for connecting said first and second hydraulic wheel turning cylinders to said source of hydraulic pressure and in a second hydraulic circuit relation with each other for turning said front wheels means through a 90 degree angle,
 a second control valve means having a two-wheel mode for isolating said third and fourth hydraulic wheel turning cylinders from the source of hydraulic pressure and a four-wheel steering mode for connecting said third and fourth hydraulic wheel turning cylinders to said source of pressure for turning said rear wheel means through a 90 degree angle, actuating means for selectively placing said first and second control valve means in their two or four-wheel steering modes, and steering means disposed between said first control valve means and said source of hydraulic pressure for regulating the flow of hydraulic fluid to said first and second hydraulic wheel turning cylinders to control the turning angle of said front wheel means during two-wheel steering.

2. The steering system set forth in claim 1 wherein said first and second hydraulic wheel turning cylinders are placed in a series relation by said first control valve means when in said two-wheel steering mode so that said cylinders turn their respective wheels through different turning angles, said first and second cylinders being placed in a parallel relation during four-wheel steering so that cylinders will move their respective wheels through 90 degrees.

3. The steering system set forth in claim 2 and including a hydraulic drive motor coupled to each of said front wheel means and each having forward and reverse directions, and valve means operative when in a two-wheel mode for connecting said hydraulic motors to said source of hydraulic pressure for rotation in the same direction when said first and second hydraulic cylinders are connected in a series and for driving one of said first wheels in a direction opposite to the other when said first and second hydraulic cylinders are connected in parallel.

4. The steering system set forth in claims 1 or 2 wherein when said first control valve means is in its four-wheel mode, said steering means is operative when turned in one direction for providing hydraulic pressure to one end of each side first and second wheel turning cylinders for turning the front wheel means through 90 degrees in opposite directions, said steering means being operative when turned in an opposite direction to pressurize the opposite ends of said first and second wheel turning cylinders for returning said front wheel means to an unpivoted position, said second hydraulic control valve means having a first position wherein one end of each of said third and fourth wheel turning cylinders are pressurized to pivot said rear wheel means through an angle of 90 degrees, said second control valve means having a second position for pressurizing the other ends of each of said third and fourth wheel turning cylinders for returning said rear wheel means to their unpivoted positions.

5. A steering system for a gantry-type crane having a pair of front wheel means and a pair of rear wheel means, a source of hydraulic pressure, first and second hydraulic wheel turning cylinders coupled respectively to said front wheel means and third and fourth hydraulic wheel turning cylinders coupled respectively to said rear wheel means, said hydraulic wheel turning cylinders being operable when pressurized to turn its respective wheel means through at least a right angle, hydraulic control means coupled to said hydraulic wheel turning means and to said source of hydraulic pressure and having a two-wheel steering mode for connecting said first and second hydraulic wheel turning cylinders to said source of hydraulic pressure and in a series hydraulic circuit relation to each other so that said pair of front wheel means turn in the same direction for two-wheel steering and having a four-wheel mode for connecting each of said first and second hydraulic wheel turning cylinders in a parallel circuit relation to each other and for connecting each of said hydraulic wheel turning cylinders to said source of hydraulic pressure for turning and said front and rear wheel means through 90 degree angles, actuating means for selectively placing said control means in its two or four-wheel steering modes, and steering means disposed between said hydraulic control means and said source of hydraulic pressure for regulating the flow of hydraulic fluid to said first and second hydraulic wheel turning cylinders to control the turning angle of said front wheel means during two-wheel steering.

6. The steering system set forth in claim 5 and including a hydraulic drive motor coupled to each of said front wheel means and each having forward and reverse directions, and valve means operative when in a two-wheel mode for connecting said hydraulic motors to said source of hydraulic pressure for rotation in the same direction when said first and second hydraulic cylinders are connected in a series and for driving one of said front wheels in a direction opposite to the other when said first and second hydraulic cylinders are connected in parallel.

7. The steering system set forth in claims 5 or 6 wherein when said hydraulic control means is in its four-wheel mode said steering means is operative when turned in one direction for providing hydraulic pressure to one end of each said first and second hydraulic wheel turning cylinders for turning the front wheel means through 90 degrees in opposite directions, said steering means being operative when turned in an opposite direction to pressurize the opposite ends of said first and second hydraulic wheel turning cylinders for returning said front wheel means to an unpivoted position, said hydraulic control means also being selectively operative when in its four-wheel steering mode to pressurize one end of each of said third and fourth cylinders to pivot said rear wheel means through an angle of 90 degrees and for pressurizing the other ends of each of said third and fourth cylinders for returning said rear wheel means to their unpivoted positions.

* * * * *